United States Patent [19]

Hane et al.

[11] Patent Number: 5,995,018

[45] Date of Patent: Nov. 30, 1999

[54] INFORMATION TRANSFER SYSTEM

[75] Inventors: Toshihide Hane, Osaka; Kazuhiro Mori, Katano, both of Japan

[73] Assignee: Matsushita Electronics Corporation, Osaka, Japan

[21] Appl. No.: 09/067,295

[22] Filed: Apr. 27, 1998

[30] Foreign Application Priority Data

Apr. 28, 1997 [JP] Japan ................................. 9-110772

[51] Int. Cl.⁶ ................................................. G06F 15/00
[52] U.S. Cl. ..................... 340/825.54; 235/384; 235/382
[58] Field of Search ....................... 340/825.54; 235/384, 235/382

[56] References Cited

U.S. PATENT DOCUMENTS 5,831,547  11/1998  Ohtsuki et al. ..................... 340/825.54

FOREIGN PATENT DOCUMENTS 5-314077  11/1993  Japan .
5-92870   12/1993  Japan .
9-044756  2/1997   Japan .

*Primary Examiner*—Harold I. Pitts
*Attorney, Agent, or Firm*—Renner, Otto, Boisselle & Sklar, P.L.L.

[57] ABSTRACT

An information transfer system includes an IC card including a communicating section; a passage checking apparatus for checking passage through a gate using the IC card, without being in physical contact with the IC card; and a display device for displaying information of the IC card, wherein the passage checking apparatus includes a communicating section for transmitting passage check information required to check passage through the gate and additional information other than the passage check information to the IC card and for receiving the passage check information from the IC card, the IC card includes a memory for storing the additional information transmitted from the passage checking apparatus, and the display device includes a communication section for obtaining the additional information stored in the memory of the IC card.

8 Claims, 5 Drawing Sheets

INFORMATION TRANSFER SYSTEM

BACKGROUND OF THE INVENTION

1. Field of the Invention

The present invention relates to an information transfer system for conducting information providing services. The information transfer system includes a passage checking apparatus for checking passage through a gate using an IC (integrated circuit) card.

2. Description of the Related Art

In recent years, IC cards internally including a semiconductor chip have been increasingly utilized as cards used for passing through automated ticket gates, instead of magnetic cards. Moreover, the information interface of the IC card is changing from a contact type to a non-contact type. As a result, battery-less IC cards are becoming widespread.

However, the use of conventional IC cards has been considerably limited. For example, a conventional IC card serving as a ticket can be used only for an automated ticked gate. Moreover, it has been generally difficult for an IC card user to see the information stored in his/her IC card.

SUMMARY OF THE INVENTION

According to one aspect of the present invention, an information transfer system includes an IC card including a communicating section; a passage checking apparatus for checking passage through a gate using the IC card, without being in physical contact with the IC card; and a display device for displaying information of the IC card, wherein the passage checking apparatus includes a communicating section for transmitting passage check information required to check passage through the gate and additional information other than the passage check information to the IC card and for receiving the passage check information from the IC card, the IC card includes a memory for storing the additional information transmitted from the passage checking apparatus, and the display device includes a communication section for obtaining the additional information stored in the memory of the IC card.

In one embodiment, the passage checking apparatus includes a first portion and a second portion which is different from the first portion, and the passage checking apparatus transmits and receives the passage check information via the first portion and transmits the additional information via the second portion.

In one embodiment, the passage checking apparatus and the display device each supplies power to the IC card, using a radio wave having a prescribed frequency.

In one embodiment, the IC card includes a display section for displaying the additional information transmitted from the passage checking apparatus.

In one embodiment, the display section is a ferroelectric liquid crystal display or an anti-ferroelectric liquid crystal display.

In one embodiment, the information transfer system further includes an information providing apparatus, the information providing apparatus including a memory for storing the additional information, and a transmission section for transmitting information selected from the additional information stored in the memory to the IC card.

In one embodiment, the information providing apparatus supplies power to the IC card, using a radio wave having a prescribed frequency.

In one embodiment, the IC card is a ticket, and the passage checking apparatus is an automated ticket gate for checking the ticket.

Thus, the invention described herein makes possible the advantage of providing an information transfer system capable of providing various kinds of information using an IC card having a wider range of use.

This and other advantages of the present invention will become apparent to those skilled in the art upon reading and understanding the following detailed description with reference to the accompanying figures.

BRIEF DESCRIPTION OF THE DRAWINGS

FIG. 4 is a diagram showing an outward appearance of an information providing apparatus 20a.

DESCRIPTION OF THE PREFERRED EMBODIMENTS

Hereinafter, examples of the present invention will be described with reference to the accompanying drawings.

EXAMPLE 1

Figure 1:
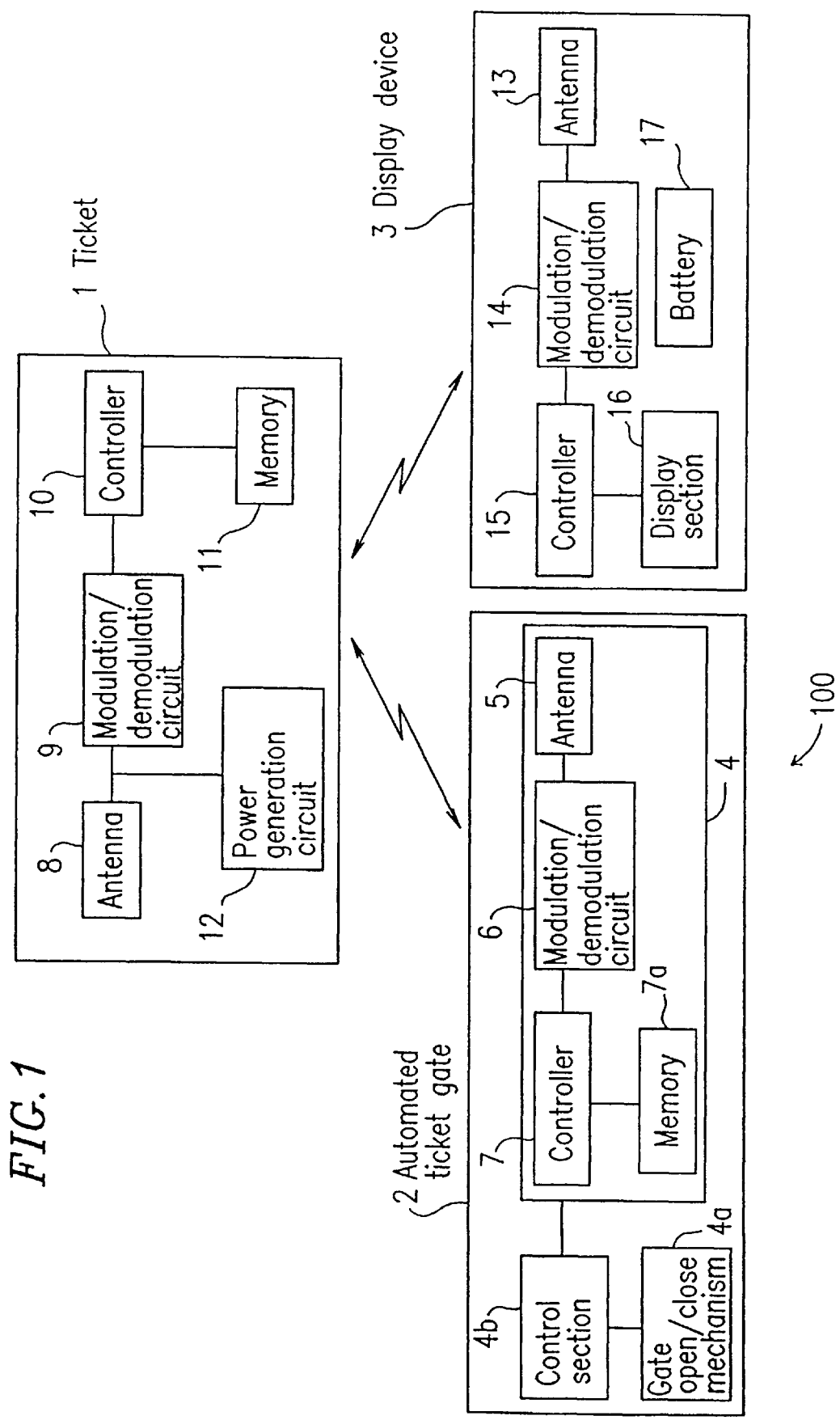
FIG. 1 is diagram showing a structure of an information transfer system 100 according to Example 1 of the present invention.

FIG. 1 shows a structure of an information transfer system 100 according to Example 1 of the present invention.

The information transfer system 100 includes a ticket 1 in the form of an IC card, an automated ticket gate 2 for checking a ticket in an automated manner, and a display device 3 for displaying the contents of the ticket 1.

First, the structure of the automated ticket gate 2 will be described.

The automated ticket gate 2 includes a reader/writer section 4 for transmitting or receiving information to or from the ticket 1, a gate open/close mechanism 4a for opening and closing a gate (not shown in FIG. 1; see FIG. 2), and a control section 4b for controlling the reader/writer section 4 and the gate open/close mechanism 4a. It should be noted that, in the case where a plurality of automated ticket gates 2 are provided, each control section 4b preferably includes a function to control communication with the other automated ticket gate(s) 2.

The reader/writer section 4 includes an antenna 5, a modulation/demodulation circuit 6, a controller 7 and a memory 7a.

Data stored in the memory 7a is modulated by the modulation/demodulation circuit 6. The modulated data is supplied to the antenna 5.

The reader/writer section 4 transfers the modulated data to the ticket 1 by means of a radio wave transmitted from the antenna 5. The reader/writer section 4 also supplies power to the ticket 1 by means of a radio wave transmitted from the antenna 5.

For transferring information to the ticket 1, a radio wave having a frequency of, for example, 13.56 MHz or 3.39 MHz is used. For supplying power to the ticket 1, a radio wave having a frequency of, for example, 13.56 MHz is used. The radio wave having a frequency of 3.39 MHz is obtained by, for example, dividing the radio wave having a frequency of 13.56 MHz.

Data received by the antenna 5 is demodulated by the modulation/demodulation circuit 6. The demodulated information is stored in the memory 7a.

The controller 7 controls a read/write operation to/from the memory 7a, a modulation/demodulation operation of the modulation/demodulation circuit 6, and a data transmission/ reception operation of the antenna 5.

The structure of the ticket 1 will now be described.

The ticket 1 is an IC card internally including a semiconductor chip. The ticket 1 includes an antenna 8, a modulation/demodulation circuit 9, a controller 10, a memory 11 and a power generation circuit 12.

A writable and non-volatile memory is used as the memory 11 of the ticket 1. The memory 11 is, for example, a ferroelectric memory or an electrically erasable and programmable read only memory (EEPROM).

A radio wave transmitted from the antenna 5 of the automated ticket gate 2 is received by the antenna 8 of the ticket 1. The power generation circuit 12 generates a voltage in response to the radio wave received by the antenna 8. Thus, the power generation circuit 12 supplies power to each element of the ticket 1. The power generation circuit 12 includes, for example, a rectifying circuit with a diode bridge, and a capacitor.

Data received by the antenna 8 is demodulated by the modulation/demodulation circuit 9. The demodulated data is stored in the memory 11 through the controller 10.

The structure of the display device 3 will now be described.

The display device 3 includes an antenna 13, a modulation/demodulation circuit 14, a controller 15, a display section 16 and a battery 17.

The display device 3 except for the display section 16 has a function corresponding to that of the reader/writer section 4 of the automated ticket gate 2. The display device 3 reads data stored in the memory 11 of the ticket 1 and displays the read data.

When the ticket 1 is set to a prescribed portion of the display device 3 such that the antenna 8 of the ticket 1 and the antenna 13 of the display device 3 are in close proximity to each other, the display device 3 supplies power to the ticket 1 by means of a radio wave transmitted from the antenna 13, and the antenna 13 receives data from the ticket 1. The data received by the antenna 13 is demodulated by the modulation/demodulation circuit 14. The demodulated data is supplied to the controller 15. The controller 15 controls each element of the display device 3, as well as controls the display section 16 such that required data of the modulated data is displayed on the display section 16.

The battery 17 supplies power to each element of the display device 3.

In the case where the display device 3 is of a small hand-held type, the display section 16 is preferably a liquid crystal display. In the case where the display device 3 is placed at, for example, a railway station, the display section 16 may be a cathode-ray tube, a light-emitting diode, a plasma display or the like.

Figure 2:
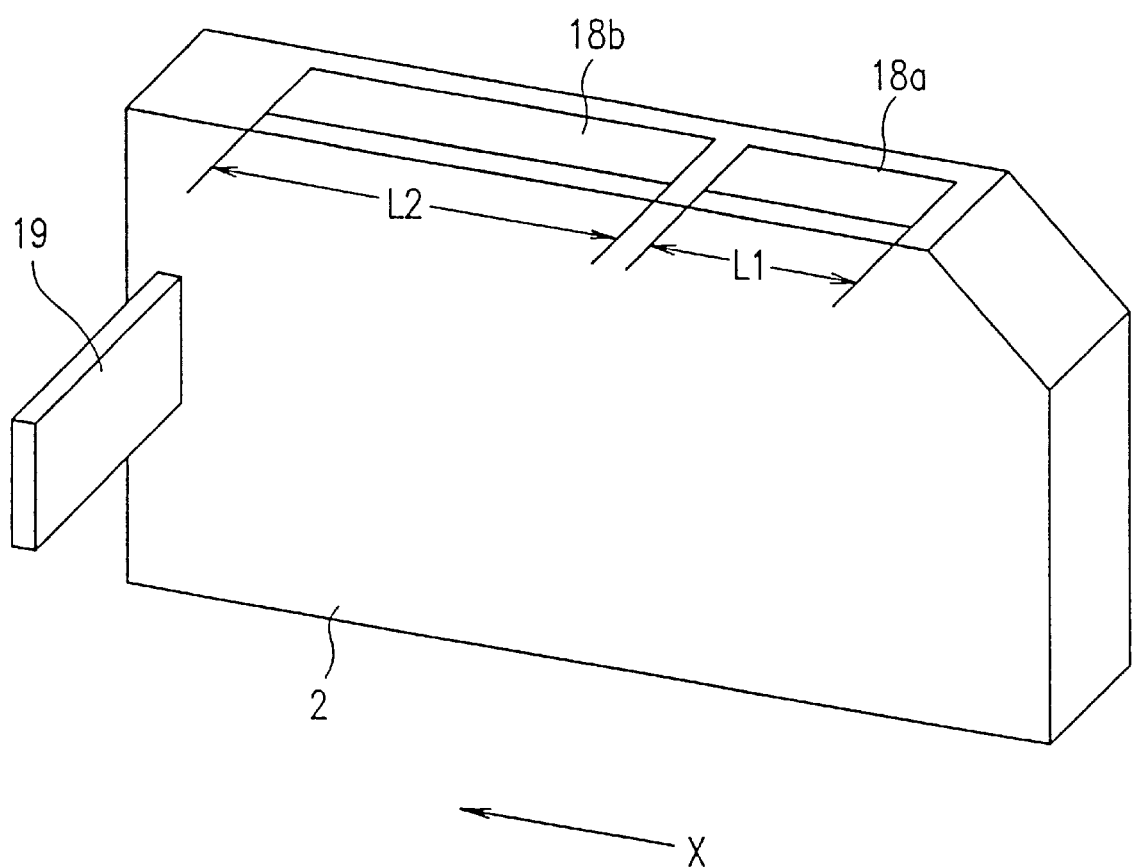
FIG. 2 is a diagram showing an outward appearance of an automated ticket gate 2.

FIG. 2 shows an outward appearance of the automated ticket gate 2. Radio-wave supply ports 18a and 18b are provided at a top surface of the automated ticket gate 2. Both radio-wave supply ports 18a and 18b are connected to the reader/writer section 4. The reader/writer section 4 transmits different data from each radio-wave supply port. For example, the reader/writer section 4 transmits information which is used to determine whether or not a person with a ticket 1 is allowed to pass through a gate 19 (i.e., passage check information) from the radio-wave supply port 18a and receives information from the ticket 1. In addition, the reader/writer section 4 transmits information other than the passage check information (i.e., additional information) from the radio-wave supply port 18b. In this case, the passage check information and the additional information are both stored in the memory 7a of the reader/writer section 4.

Alternatively, the radio-wave supply ports 18a and 18b may be connected to different reader/writer sections. For example, the radio-wave supply port 18a may be connected to the reader/writer section 4, whereas the radio-wave supply port 18b may be connected to a reader/writer section (not shown) which is different from the reader/writer section 4. Such a reader/writer section has the same function and structure as those of the reader/writer section 4. In this case, the passage check information may be stored in the memory 7a of the reader/writer section 4, whereas the additional information may be stored in a memory (not shown) of the other reader/writer section.

In order that the radio-wave supply port 18b can transmit a larger amount of information than the radiowave supply port 18a, the radio-wave supply ports 18a and 18b are preferably formed such that the length of the radio-wave supply port 18b is longer than that of the radio-wave supply port 18a. Assuming that a person walks at a fixed speed, the longer the length of a radio-wave supply port along the direction in which the person walks is, the more information that radio-wave supply port can transmit.

In this specification, the expression "the length of the radio-wave supply port" is a length along the direction in which a person walks while passing through the automated ticket gate 2. In FIG. 2, the length of the radio-wave supply port 18a is denoted by L1, and the length of the radio-wave supply port 18b is denoted by L2. In addition, the direction in which a person walks is denoted by arrow X.

The radio-wave supply port 18a for transmitting and receiving passage check information and the radio-wave supply port 18b for transmitting additional information are provided separately. As a result, an additional information service will not be provided to those who do not want such a service. More specifically, a person who does not want an additional information service need only walk through the gate 19 without passing the ticket 1 over the radio-wave supply port 18b.

The gate 19 is opened and closed by the gate open/close mechanism 4a of the automated ticket gate 2. The gate open/close mechanism 4a is controlled by the control section 4b.

In an example shown in FIG. 2, the automated ticket gate 2 has a structure provided with two radio-wave supply ports 18a and 18b. Alternatively, the automated ticket gate 2 may have a structure provided with a single radio-wave supply port. In this case, the passage check information and the additional information are transmitted and received through the single radio-wave supply port connected to a single reader/writer section.

Operation of the information transfer system 100 will now be described.

The ticket 1 is an IC card. Typically, the ticket 1 is a commuter's pass or a ticket of an advance-payment type (a stored-fare type or a pre-paid type). The memory 11 of the ticket 1 has a memory capacity larger than that required for automated ticket-checking, in order that not only information necessary for automated ticket-checking (i.e., passage check information) but also information which does not relate to automated ticket-checking (i.e., additional information) can be stored in the memory 11.

When the ticket 1 passes over the radio-wave supply port 18a of the automated ticket gate 2, the ticket 1 receives a radio wave transmitted from the reader/writer section 4 of the automated ticket gate 2. The ticket 1 receives a power supply by means of the received radio wave. Thus, the ticket 1 and the reader/writer section 4 of the automated ticket gate 2 become ready for communication.

The automated ticket gate 2 transmits passage check information through the radio-wave supply port 18a to the ticket 1, or receives passage check information from the ticket 1 through the radio-wave supply port 18a. The passage check information is data indicating, for example, the effective fare zone, the expiration date, the station of origin, the remaining amount of money of the ticket, the time when the person with the ticket passes through the gate 19, and the location of the gate 19.

The automated ticket gate 2 verifies the validity of the ticket 1 by transmitting and receiving the passage check information with the ticket 1. The automated ticket gate 2 conducts such verification by judging the passage check information received from the ticket 1. In the case where the ticket 1 is valid, the gate 19 is opened, whereby a person with that ticket 1 can pass through the gate 19. In the case where the ticket 1 is invalid, however, the gate 19 will not be opened.

In such a manner as described above, the automated ticket gate 2 checks passage of a person with a ticket 1 through the gate 19, without being in contact with the ticket 1.

The automated ticket gate 2 transmits additional information, that is, information other than the passage check information, to the ticket 1 through the radio-wave supply port 18b. The additional information may be data indicating, for example, a map of the area around a station where the automated ticket gate 2 is placed, public buildings and historic spots around the station, and/or a time table. Such additional information is stored in the memory 11 of the ticket 1. Such additional information is useful for those who go outside the premises of the station after passing through the automated ticket gate 2, because they can get additional information in their usual course of action, that is, by passing through the automated ticket gate 2.

The contents of the additional information may be displayed by the display device 3. The display device 3 is placed, for example, near an exit of the automated ticket gate 2. In order to display the contents of the additional information, the ticket 1 is set to a prescribed portion of the display device 3 such that the antenna 8 of the ticket 1 and the antenna 13 of the display device 3 are in close proximity to each other. The display device 3 supplies power to the ticket 1 by means of a radio wave having a prescribed frequency, reads the additional information stored in the memory 11 of the ticket 1 by communicating with the ticket 1, and displays the additional information it has read.

In the foregoing, an example in which data transmitted from the automated ticket gate 2 is displayed has been described. However, the present invention is not limited to this. For example, the display device 3 may display data specific to a ticket 1 (for example, the expiration date of the ticket 1, or a remaining amount of money in the case of an advance-payment type ticket), because the data specific to the ticket 1 is also stored in the memory 11 of the ticket 1. The sort of data to be displayed may be selected using, for example, a key provided in the display device 3.

In order that the position of the antenna 8 of the ticket 1 and the position of the antenna 13 of the display device 3 are better aligned with each other, with the ticket 1 and the display device 3 being in closer proximity with each other, the display device 3 preferably has an opening for accommodating insertion of the ticket 1. Alternatively, the display device 3 preferably has a recess for more precisely aligning the position of the antenna 8 of the ticket 1 with the position of the antenna 13 of the display device 3.

Moreover, in order to reduce the load imposed on the battery 17 of the display device 3, it is preferable to provide a sensor for detecting the presence or absence of the ticket 1 in the ticket accommodating opening or in the aligning recess, so that a radio wave is transmitted or received via the antenna 13 of the display device 3 only when the ticket 1 is present.

EXAMPLE 2

Figure 3:
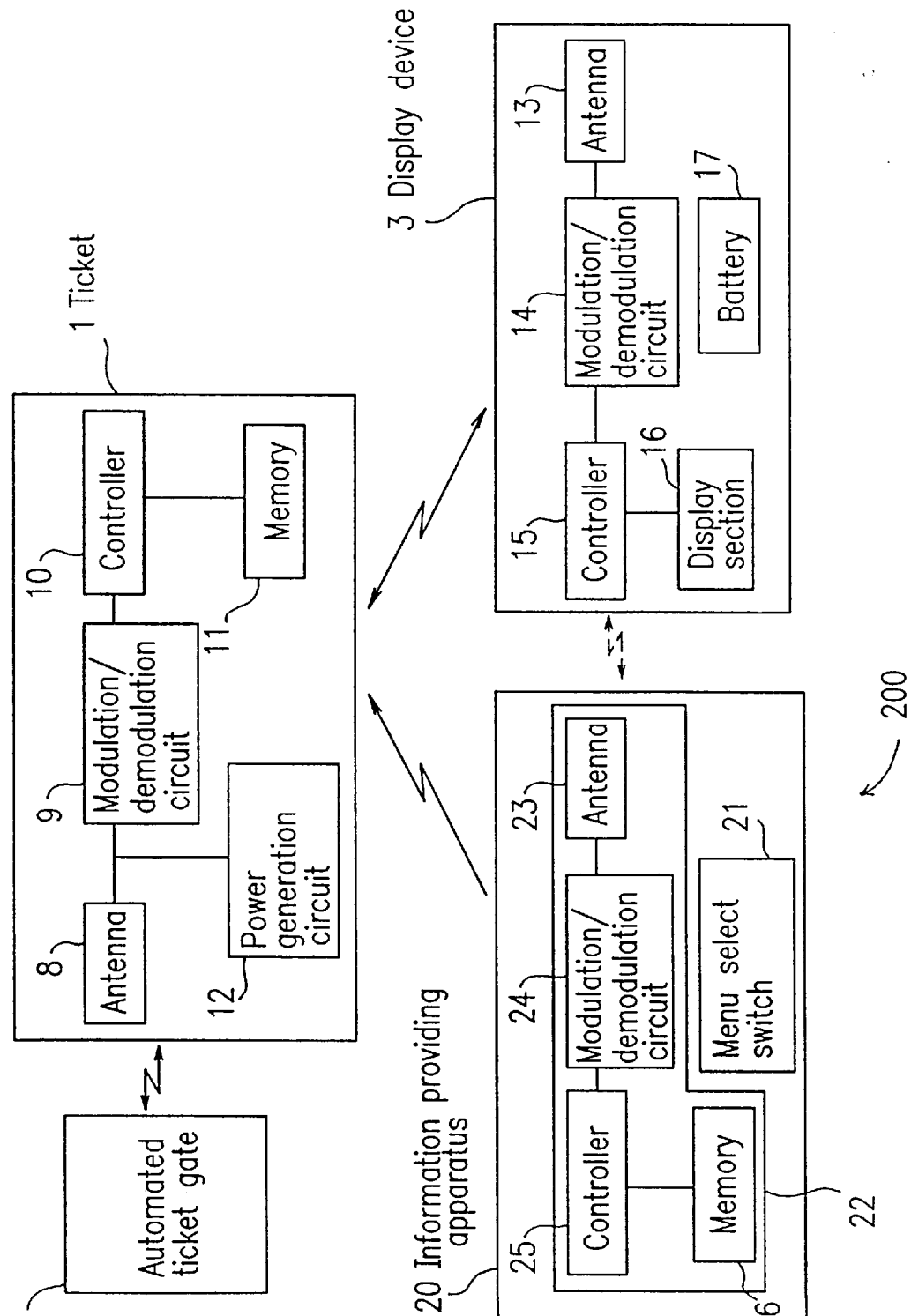
FIG. 3 is a diagram showing a structure of an information transfer system 200 according to Example 2 of the present invention.

FIG. 3 shows a structure of an information transfer system 200 according to Example 2 of the present invention.

The information transfer system 200 includes a ticket 1, an automated ticket gate 2 and a display device 3 which are the same as those described in Example 1, and further includes an information providing apparatus 20. Like elements are denoted with like reference numerals and characters in FIGS. 1 and 3, and description thereof will be omitted in Example 2.

The information providing apparatus 20 is used to obtain more information than the information provided from the automated ticket gate 2. The information providing apparatus 20 includes a menu select switch 21 and a reader/writer section 22 for transmitting data to the ticket 1.

The reader/writer section 22 includes an antenna 23, a modulation/demodulation circuit 24, a controller 25 and a memory 26.

The menu select switch 21 is used to select data to be down-loaded to the ticket 1 from the data stored in the memory 26. The selected data is modulated by the modulation/demodulation circuit 24. The modulated data is supplied to the antenna 23.

The reader/writer section 22 transfers the modulated data to the ticket 1 by means of a radio wave transmitted from the antenna 23. Moreover, the reader/writer section 22 supplies power to the ticket 1 by means of a radio wave transmitted from the antenna 23.

The data received by the antenna 8 of the ticket 1 is demodulated by the modulation/demodulation circuit 9. The demodulated data is stored in the memory 11 through the controller 10.

Thus, the data selected using the menu select switch 21 is down-loaded into the memory 11 of the ticket 1.

A method for viewing the contents of the data provided to the ticket 1 by the information providing apparatus 20 is the same as the method for viewing the contents of the data transferred from the automated ticket gate 2 to the ticket 1. More specifically, the contents of the data stored in the memory 11 of the ticket 1 are displayed by the display device 3. In order to display the contents of the data, the ticket 1 is set to a prescribed portion of the display device 3 such that the antenna 8 of the ticket 1 and the antenna 13 of the display device 3 are in close proximity to each other.

It should be noted that the reader/writer section 22 of the information providing apparatus 20 may communicate also with the display device 3 in addition to the ticket 1. In such a case, as opposed to the case where the display device 3 communicates with the ticket 1, the display device 3 need not supply power to the information providing apparatus 20 by means of a radio wave having a prescribed frequency. Accordingly, the display device 3 must be set not to transmit a radio wave for power supply.

Figure 4:
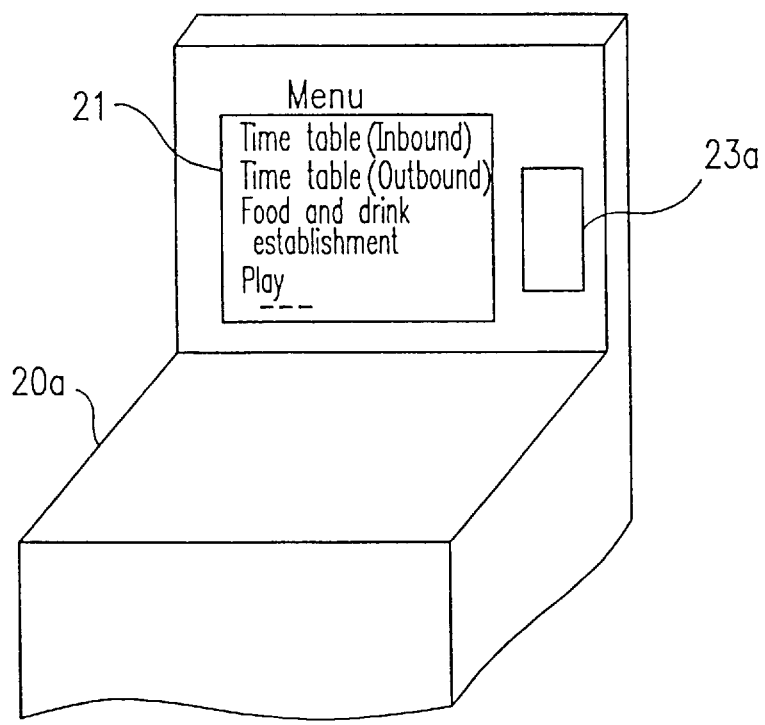

FIG. 4 shows an outward appearance of such an information providing apparatus 20a as placed at or around a station. The information providing apparatus 20a is the same in function and structure as the information providing apparatus 20 of FIG. 3.

When one of a plurality of menu items displayed on a display 21 is selected with a ticket 1 being held in front of a region 23a of the information providing apparatus 20a, information corresponding to the selected menu item is transferred from the information providing apparatus 20a to the ticket 1. The menu items displayed on the display 21 may include, for example, a time table, food and drink establishment, sight-seeing spots and resorts in the area around the location of the information providing apparatus 20a. The selection of the menu items may be conducted through, for example, a touch panel. Alternatively, the selection may be performed through an input device such as a mouse.

Figure 5:
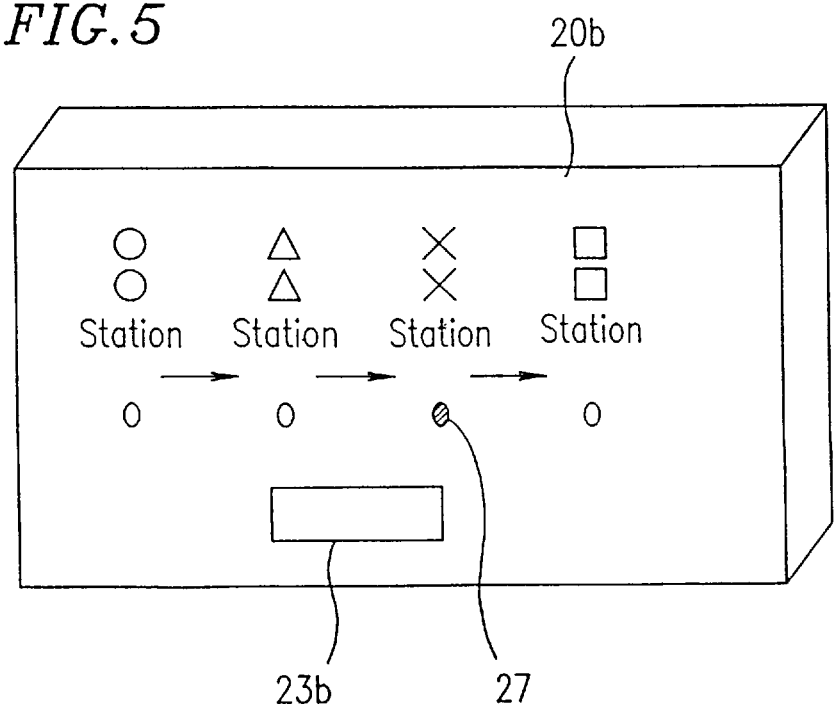
FIG. 5 is a diagram showing an outward appearance of an information providing apparatus 20b.

FIG. 5 shows an outward appearance of such an information providing apparatus 20b as placed in means of transportation such as trains and buses. The information providing apparatus 20b is the same in function and structure as the information providing apparatus 20 of FIG. 3.

The information providing apparatus 20b has a function to display the operational state of the means of transportation (e.g., a train). For example, a lamp 27 indicates the next station at which the train will stop.

When the ticket 1 is held in front of a region 23b of the information providing apparatus 20b while the lamp 27 is ON, information about the area around the station indicated by the ON-state lamp 27 is transferred from the information providing apparatus 20b to the ticket 1.

EXAMPLE 3

Figure 6:
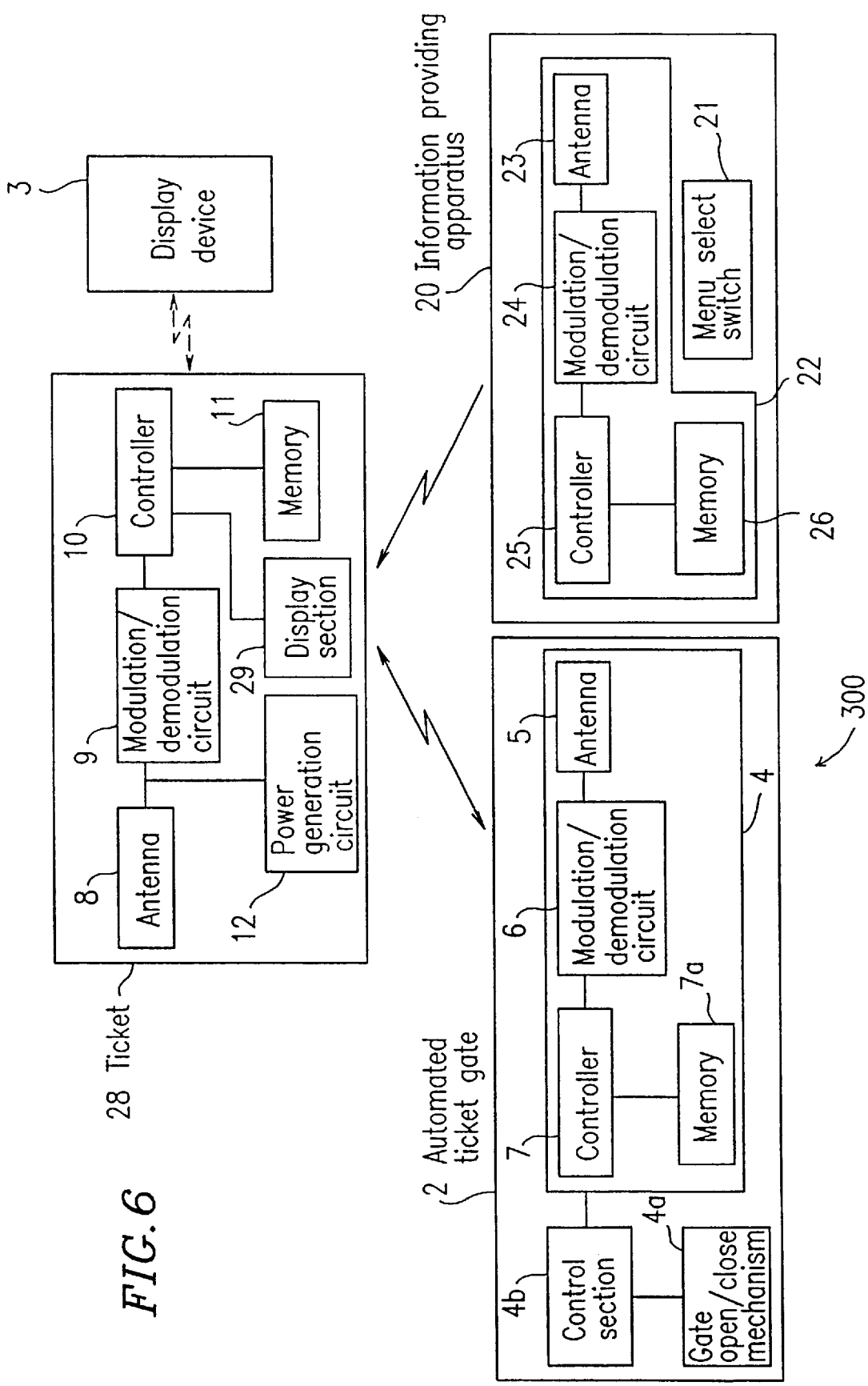
FIG. 6 is a diagram showing a structure of an information transfer system 300 according to Example 3 of the present invention.

FIG. 6 shows a structure of an information transfer system 300 according to Example 3 of the present invention.

The information transfer system 300 includes a ticket 28, an automated ticket gate 2 and an information providing apparatus 20. Like elements are denoted with like elements in FIGS. 1, 3 and 6, and description thereof will be omitted in Example 3.

The ticket 28 further includes a display section 29 in addition to the elements of the ticket 1 shown in FIGS. 1 and 3. The display section 29 preferably has the capability to maintain its display state even after the power supply is stopped. The display section 29 may be, for example, a ferroelectric liquid crystal display or an anti-ferroelectric liquid crystal display.

When the ticket 28 is carried to a place where a radio wave from the reader/writer section 4 of the automated ticket gate 2 or a radio wave from the reader/writer section 22 of the information providing apparatus 20 does not reach, the power supply to the ticket 28 will be stopped. However, since the display section 29 is provided in the ticket 28, the display state of the display section 29 can be maintained even after the power supply to the ticket 28 is stopped.

According to the information transfer system 300, ticket checking can be conducted in an automated manner by the ticket 28 and the automated ticket gate 2. Moreover, information from the automated ticket gate 2 and the information providing apparatus 20 can be received by the ticket 28 for display.

It should be noted that, in the case where display on the display section 29 of the ticket 28 is not sufficient, the display device 3 can be utilized. The function and structure of the display device 3 are the same as those described in Examples 1 and 2.

In each of Examples 1 to 3 described above, an information transfer system including a ticket in the form of an IC card and an automated ticket gate has been described as an example of the information transfer system. However, the application range of the present invention is not limited to this.

The present invention may be applied to any systems which include an IC card and a passage checking apparatus for checking passage through a gate using the IC card. Any systems having a function to transfer information other than passage check information required for passage through the gate (i.e., additional information) to the IC card and display the additional information are also within the scope of the present invention.

For example, the present invention can be applied to a system for collecting the toll of a toll road. An IC card may be used to pay a toll at a tollgate. The IC card would typically be placed on a dashboard of a motor vehicle. The IC card and a toll checking apparatus communicate with each other by means of a radio wave. The toll checking apparatus updates the remaining amount of money stored in a memory of the IC card. In this way, the toll of the toll road is collected.

Additional information may be transferred from the toll checking apparatus to the IC card. The additional information would be stored in the memory of the IC card. The additional information stored in the memory of the IC card may be displayed on a display device. The additional information may include, for example, a map of the area around the location of the tollgate. Alternatively, the additional information may be traffic information such as information about an accident or a traffic jam.

The present invention can also be applied to an entrance/exit checking system of a building. In this case, an IC card would be used to determine whether or not a person with the IC card is allowed to pass through an entrance/exit of the building. The IC card and a passage checking apparatus would communicate with each other by means of a radio wave. The passage checking apparatus accesses information stored in a memory of the IC card. In this way, whether or not the person with the IC card is allowed to pass through the entrance/exit of the building may be determined.

Additional information is transferred from the passage checking apparatus to the IC card. The additional information is stored in the memory of the IC card. The additional information stored in the memory of the IC card may be displayed on a display device. The additional information may be, for example, a guide map of the building.

The building may be, for example, a pavilion in an amusement park. In such a case, the additional information may be information about an article exhibited at the pavilion or a vehicle in the pavilion.

In this specification, the term "gate" is defined as including not only a gate having a physical structure, such as a barrier, and capable of being opened and closed but also a virtual gate. In the case of the system for collecting the toll of a toll road, for example, it is preferable not to provide any gate having a physical structure and capable of being opened and closed (e.g., a crossing gate) in order to facilitate smooth passage of motor vehicles through a tollgate. However, the system for collecting the toll of a toll road has a "gate." In other words, the place where the tollgate is located corresponds to a virtual gate. In the case of the entrance/exit checking system of a building, an entrance/exit of the building corresponds to a virtual gate regardless of whether or not a gate having a physical structure and capable of being opened and closed is provided.

According to the present invention, information other than passage check information required to check passage through a gate (i.e., additional information) may be transferred from the passage checking apparatus or the information providing apparatus to an IC card. The additional information transferred to the IC card may be displayed on a display section provided in the IC card or on a display device provided separately from the IC card. Thus, an IC card user can get the additional information by passing through the gate and know the contents of the additional information. As a result, a new use of the IC card can be provided in addition to the use for checking passage through the gate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information transfer system, comprising:
   an IC card including a communicating section;
   a passage checking apparatus for checking passage through a gate using the IC card, without being in physical contact with the IC card; and
   a display device for displaying information of the IC card, wherein
      the passage checking apparatus includes a communicating section for transmitting passage check information required to check passage through the gate and additional information other than the passage check information to the IC card and for receiving the passage check information from the IC card,
      the IC card includes a memory for storing the additional information transmitted from the passage checking apparatus, and
      the display device includes a communication section for obtaining the additional information stored in the memory of the IC card.

2. An information transfer system according to claim 1, wherein
   the passage checking apparatus includes a first portion and a second portion which is different from the first portion, and
   the passage checking apparatus transmits and receives the passage check information via the first portion and transmits the additional information via the second portion.

3. An information transfer system according to claim 1, wherein
   the passage checking apparatus and the display device each supplies power to the IC card, using a radio wave having a prescribed frequency.

4. An information transfer system according to claim 1, wherein
   the IC card includes a display section for displaying the additional information transmitted from the passage checking apparatus.

5. An information transfer system according to claim 4, wherein
   the display section is a ferroelectric liquid crystal display or an anti-ferroelectric liquid crystal display.

6. An information transfer system according to claim 1, further comprising:
   an information providing apparatus,
   the information providing apparatus including a memory for storing the additional information, and a transmission section for transmitting information selected from the additional information stored in the memory to the IC card.

7. An information transfer system according to claim 6, wherein
   the information providing apparatus supplies power to the IC card, using a radio wave having a prescribed frequency.

8. An information transfer system according to claim 1, wherein
   the IC card is a ticket, and the passage checking apparatus is an automated ticket gate for checking the ticket.

* * * * *